(12) United States Patent
Piao et al.

(10) Patent No.: US 10,531,102 B2
(45) Date of Patent: Jan. 7, 2020

(54) ENCODING DEVICE, DECODING DEVICE, AND ENCODING AND DECODING METHOD THEREOF

(71) Applicant: SAMSUNG ELECTRONICS CO., LTD., Suwon-si (KR)

(72) Inventors: Yin-ji Piao, Yongin-si (KR); Ki-ho Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 15/743,941

(22) PCT Filed: Jul. 26, 2016

(86) PCT No.: PCT/KR2016/008159
§ 371 (c)(1),
(2) Date: Jan. 11, 2018

(87) PCT Pub. No.: WO2017/043763
PCT Pub. Date: Mar. 16, 2017

(65) Prior Publication Data
US 2018/0205958 A1    Jul. 19, 2018

Related U.S. Application Data

(60) Provisional application No. 62/216,578, filed on Sep. 10, 2015.

(51) Int. Cl.
*H04N 19/18* (2014.01)
*H04N 19/129* (2014.01)
(Continued)

(52) U.S. Cl.
CPC ........... *H04N 19/18* (2014.11); *H04N 19/119* (2014.11); *H04N 19/129* (2014.11); *H04N 19/70* (2014.11)

(58) Field of Classification Search
CPC ...... H04N 19/18; H04N 19/70; H04N 19/119; H04N 19/167; H04N 19/129
(Continued)

(56) References Cited

U.S. PATENT DOCUMENTS

| 7,095,896 B2 | 8/2006 | Abe et al. |
| 8,976,861 B2 | 3/2015 | Rojals et al. |

(Continued)

FOREIGN PATENT DOCUMENTS

| EP | 2852166 A1 | 3/2015 |
| JP | 2014-504077 A | 2/2014 |

(Continued)

OTHER PUBLICATIONS

Communication dated Apr. 5, 2018, from the European Patent Office in counterpart European Application No. 16844583.1.

(Continued)

*Primary Examiner* — Zaihan Jiang
(74) *Attorney, Agent, or Firm* — Sughrue Mion, PLLC

(57) ABSTRACT

An encoding device for encoding a bit stream including an image frame may include an encoder configured to determine a position of a pixel having a last non-zero coefficient in a conversion coefficient block constituting the image frame with reference to a predetermined pixel of the conversion coefficient block, identify a sub-block including the last non-zero coefficient, among a plurality of sub-blocks constituting the conversion coefficient block, convert a position of the last non-zero coefficient determined with reference to the predetermined pixel of the conversion coefficient block into a position with reference to a predetermined pixel of the identified sub-block, and encode the sub-block including the last non-zero coefficient and the converted position of the last non-zero coefficient.

8 Claims, 13 Drawing Sheets

(51) Int. Cl.
  *H04N 19/119*  (2014.01)
  *H04N 19/70*  (2014.01)
(58) Field of Classification Search
  USPC .................................................. 375/240.18
  See application file for complete search history.

(56) References Cited

U.S. PATENT DOCUMENTS

| | | | |
|---|---|---|---|
| 9,014,260 B2 | 4/2015 | Alshin et al. | |
| 9,042,440 B2 | 5/2015 | Sole Rojals et al. | |
| 9,215,464 B2 | 12/2015 | Wang et al. | |
| 9,350,996 B2 | 5/2016 | Fang et al. | |
| 9,451,264 B2* | 9/2016 | Oh | H04N 19/176 |
| 9,554,154 B2* | 1/2017 | Oh | H04N 19/159 |
| 2011/0299788 A1* | 12/2011 | Suzuki | H04N 19/176 |
| | | | 382/233 |
| 2012/0314771 A1* | 12/2012 | Lim | H04N 19/117 |
| | | | 375/240.16 |
| 2012/0320990 A1 | 12/2012 | Chen et al. | |
| 2013/0064293 A1* | 3/2013 | Song | H04N 19/159 |
| | | | 375/240.03 |
| 2013/0182757 A1* | 7/2013 | Karczewicz | H04N 19/70 |
| | | | 375/240.02 |
| 2013/0188688 A1* | 7/2013 | Panusopone | H04N 19/13 |
| | | | 375/240.02 |
| 2014/0307801 A1* | 10/2014 | Ikai | H04N 19/91 |
| | | | 375/240.18 |
| 2014/0348247 A1* | 11/2014 | Tsukuba | H04N 19/91 |
| | | | 375/240.26 |
| 2015/0071359 A1* | 3/2015 | Guo | H04N 19/13 |
| | | | 375/240.18 |
| 2015/0110199 A1* | 4/2015 | Ikai | H04N 19/91 |
| | | | 375/240.18 |
| 2015/0181237 A1* | 6/2015 | Tsukuba | H04N 19/44 |
| | | | 382/233 |

FOREIGN PATENT DOCUMENTS

| | | |
|---|---|---|
| JP | 5746363 B2 | 7/2015 |
| KR | 10-2011-0099348 A | 9/2011 |
| KR | 10-2014-0120891 A | 10/2014 |
| KR | 10-2015-0032647 A | 3/2015 |
| WO | 2013116849 A1 | 8/2013 |
| WO | 2014110651 A1 | 7/2014 |

OTHER PUBLICATIONS

"High efficiency video coding", Series H: Audiovisual and Multimedia Systems Infrastructure of audiovisual services—Coding of moving video, International Telecommunication Union, ITU-T Telecommunication Standardization Sector of ITU, H.265, Apr. 2013, ((317 pages total).
Joel Sole et al., "Transform Coefficient Coding in HEVC", IEEE Transactions on Circuits and Systems for Video Technology, vol. 22, No. 12, Dec. 2012, pp. 1765-1777, (13 pages total).
Communication dated Nov. 10, 2016 by the International Searching Authority in counterpart International Patent Application No. PCT/KR2016/008159 (PCT/ISA/210).
Communication dated Nov. 10, 2016 by the International Searching Authority in counterpart International Patent Application No. PCT/KR2016/008159 (PCT/ISA/237).

\* cited by examiner

FIG. 5

| 0 | 1 | 4 |
|---|---|---|
| 2 | 3 | 6 |
| 5 | 7 | 8 |

0 : 1
1 : 01
2 : 001
3 : 0001
4 : 00001
5 : 000001
6 : 0000001
7 : 00000001
8 : 00000000

ENCODING DEVICE, DECODING DEVICE, AND ENCODING AND DECODING METHOD THEREOF

FIELD OF THE INVENTION

Devices and methods consistent with what is disclosed herein relate to an encoding device, a decoding device and an encoding and decoding method thereof, and more particularly, to an encoding device for enhancing compression performance, a decoding device and an encoding and decoding method thereof.

DESCRIPTION OF THE RELATED ART

Recently, a demand for high-resolution and high-quality images such as High Definition (HD) images and Ultra High Definition (UHD) images has been increased in various fields. In order to provide high-resolution and high-quality images, the data amount of image data increases. Therefore, the transmission cost and the storage cost of the image data for providing high-resolution and high-quality images increases compared to the existing image data processing method. Therefore, a high-efficiency image compression technique may be used for solving the problems arise when image data with high-resolution and high-quality is used.

The image compression technique generally includes Discrete Cosine Transform, Quantization, Variable Length Coding, Binary Arithmetic Coding, or the like. Lossless compression may be performed including converting an image in a spatial domain into that in a frequency domain through the discrete cosine transform, reducing data in the frequency domain using a loss compression method through the quantization, and removing redundancy of data using a statistical method through the variable length coding or a binary arithmetic coding method through context modeling.

When a non-zero conversion coefficient is encoded, position information of a pixel including a last non-zero conversion coefficient may be encoded to code information in a form of a pixel coordinate (x, y) with reference to a predetermined pixel of a block. However, if the size of the block increases (for example, a TU of 64×64 pixels), a binary value of the position information to be encoded increases, so that the amount of data to be encoded increases, thereby reducing a compression rate.

Therefore, a solution is proposed for reducing the size of information of a pixel position of a non-zero conversion coefficient to be encoded.

SUMMARY

An aspect of the exemplary embodiments relates to providing an encoding device for improving image encoding performance for enhancing compression performance by reducing the number of bins required for indicating information of a pixel position of a non-zero conversion coefficient and image decoding performance, a decoding device and an encoding and decoding method thereof.

According to an exemplary embodiment, there is provided an encoding device for encoding a bit stream including an image frame including an encoder configured to determine a position of a pixel having a last non-zero coefficient in a conversion coefficient block constituting the image frame with reference to a predetermined pixel of the conversion coefficient block, identify a sub-block including the last non-zero coefficient, among a plurality of sub-blocks constituting the conversion coefficient block, convert a position of the last non-zero coefficient determined with reference to the predetermined pixel of the conversion coefficient block into a position with reference to a predetermined pixel of the identified sub-block, and encode the sub-block including the last non-zero coefficient and the converted position of the last non-zero coefficient.

The position of the last non-zero coefficient may be represented by a pixel coordinate (x, y) which indicates that the last non-zero coefficient is disposed at an xth pixel and a yth pixel with reference to the predetermined pixel of the conversion coefficient block, and the converted position of the last non-zero coefficient may be represented by a pixel coordinate (x', y') which indicates that the last non-zero coefficient is disposed at an x'th pixel and a y'th pixel with reference to the predetermined pixel of the sub-block.

In the case where the predetermined pixel of the sub-block is represented by a pixel coordinate (a, b) with reference to the pixel coordinate of the predetermined pixel of the conversion coefficient block, the pixel coordinate (x', y') may be defined by a pixel coordinate (x−a, y−b).

The encoder may divide the conversion coefficient block into a plurality of groups, each of the plurality of groups including at least one sub-block, and encode information of a group including the last non-zero coefficient and information of a sub-block including the last non-zero coefficient of at least one sub-block constituting the group.

The encoder may encode information on sizes of the plurality of groups to at least one parameter set, among slice header, Picture Parameter Sets (PPS) and Sequence Parameter Sets (SPS).

The encoder, in response to the last non-zero coefficient being present in a first group among the plurality of groups, may encode information which indicates that the last non-zero coefficient is present in the first group and information of a sub-block including the last non-zero coefficient of at least one sub-block constituting the first group.

The encoder, in response to the last non-zero coefficient being present in a second group except the first group among the plurality of groups, may encode information which indicates that the last non-zero coefficient is not present in the first group, among the plurality of groups, information which indicates that the last non-zero coefficient is present in the second group, and information of a sub-block including the last non-zero coefficient of at least one sub-block constituting the second group.

The encoder, in response to the last non-zero coefficient being present in a third group except the first and second groups among the plurality of groups, may encode information which indicates that the last non-zero coefficient is not present in the first and second groups, among the plurality of groups, information which indicates that the last non-zero coefficient is present in the third group, and information of a sub-bock including the last non-zero coefficient of at least one sub-block constituting the third group.

The encoder may encode information of the sub-block including the last non-zero coefficient and the converted position of the last non-zero coefficient in a form of index or flag.

According to an exemplary embodiment, there is provided a decoding device for decoding a bit stream including an image frame including a receiver configured to receive a bit stream including information of a sub-block including a last non-zero coefficient, among a plurality of sub-blocks in which a conversion coefficient block constituting the image frame is divided and information of a converted position of the last non-zero coefficient determined with reference to a predetermined pixel of the conversion coefficient block from a position with reference to a predetermined pixel of the sub-block including the last non-zero coefficient, and a decoder configured to extract information of the sub-block including the last non-zero coefficient and information of the converted position from the received bit stream, decode the extracted information and determine a position of the last non-zero coefficient.

The position of the last non-zero coefficient may be represented by a pixel coordinate (x, y) with reference to the predetermined pixel of the conversion coefficient block, and the converted position of the last non-zero coefficient may be represented by a pixel coordinate (x', y') with reference to the predetermined pixel of the sub-block.

In the case where the predetermined pixel of the sub-block is represented by a pixel coordinate (a, b) with reference to the pixel coordinate of the predetermined pixel of the conversion coefficient block, the pixel coordinate (x', y') may be defined by a pixel coordinate (x−a, y−b).

The conversion coefficient block may be divided into a plurality of groups, each of the plurality of groups including at least one sub-block, the receiver may be configured to receive a bit stream including information of a group including the last non-zero coefficient and information on whether at least one sub-block constituting the group includes the last non-zero coefficient, and the decoder may be configured to extract the information of the group including the last non-zero coefficient and the information on whether the at least one sub-block constituting the group includes the last non-zero coefficient from the received bit stream, decode the extracted information and determine a sub-block including the last non-zero coefficient.

According to an exemplary embodiment, there is provided a method of encoding a bit stream including an image frame, the method including determining a position of a pixel having a last non-zero coefficient in a conversion coefficient block constituting the image frame with reference to a predetermined pixel of the conversion coefficient block, identifying a sub-block including the last non-zero coefficient, among a plurality of sub-blocks constituting the conversion coefficient block, converting a position of the last non-zero coefficient determined with reference to a predetermined pixel of the conversion coefficient block into a position with reference to a predetermined pixel of the identified sub-block, and encoding the sub-block including the last non-zero coefficient and the converted position of the last non-zero coefficient.

The position of the last non-zero coefficient may be represented by a pixel coordinate (x, y) which indicates that the last non-zero coefficient is disposed at an xth pixel and a yth pixel with reference to the predetermined pixel of the conversion coefficient block, and the converted position of the last non-zero coefficient may be represented by a pixel coordinate (x', y') which indicates that the last non-zero coefficient is disposed at an x'th pixel and a y'th pixel with reference to the predetermined pixel of the sub-block.

In the case where the predetermined pixel of the sub-block is represented by a pixel coordinate (a, b) with reference to the pixel coordinate of the predetermined pixel of the conversion coefficient block, the pixel coordinate (x', y') may be defined by a pixel coordinate (x−a, y−b).

The method may further include dividing the conversion coefficient block into a plurality of groups, each of the plurality of groups including at least one sub-block, the encoding may include encoding of information of a group including the last non-zero coefficient and information of a sub-block including the last non-zero coefficient of at least one sub-block constituting the group.

The encoding may include in response to the last non-zero coefficient being present in a first group among the plurality of groups, encoding of information which indicates that the last non-zero coefficient is present in the first group and information of a sub-block including the last non-zero coefficient of at least one sub-block constituting the first group.

The encoding may include in response to the last non-zero coefficient being present in a second group except the first group among the plurality of groups, encoding of information which indicates that the last non-zero coefficient is not present in the first group, among the plurality of groups, information which indicates that the last non-zero coefficient is present in the second group, and information of a sub-block including the last non-zero coefficient of at least one sub-block constituting the second group.

The encoding may include in response to the last non-zero coefficient being present in a third group except the first and second groups among the plurality of groups, encoding of information which indicates that the last non-zero coefficient is not present in the first and second groups, among the plurality of groups, information which indicates that the last non-zero coefficient is present in the third group, and information of a sub-bock including the last non-zero coefficient of at least one sub-block constituting the third group.

According to an exemplary embodiment, there is provided a method of decoding a bit stream including an image frame including receiving a bit stream including information of a sub-block including a last non-zero coefficient, among a plurality of sub-blocks in which a conversion coefficient block constituting the image frame is divided and information of a converted position of the last non-zero coefficient determined with reference to a predetermined pixel of the conversion coefficient block from a position with reference to a predetermined pixel of the sub-block including the last non-zero coefficient, extracting information of the sub-block including the last non-zero coefficient and information of the converted position from the received bit stream, decoding the extracted information and determining a position of the last non-zero coefficient.

The position of the last non-zero coefficient may be represented by a pixel coordinate (x, y) with reference to the predetermined pixel of the conversion coefficient block, and the converted position of the last non-zero coefficient may be represented by a pixel coordinate (x', y') with reference to the predetermined pixel of the sub-block.

In the case where the predetermined pixel of the sub-block is represented by a pixel coordinate (a, b) with reference to the pixel coordinate of the predetermined pixel of the conversion coefficient block, the pixel coordinate (x', y') may be defined by a pixel coordinate (x−a, y−b).

The conversion coefficient block may be divided into a plurality of groups, each of the plurality of groups including at least one sub-block, the receiving may include receiving a bit stream including information of a group including the last non-zero coefficient and information on whether at least one sub-block constituting the group includes the last non-zero coefficient, and the decoding may include extracting the information of the group including the last non-zero coefficient and the information on whether the at least one sub-block constituting the group includes the last non-zero coefficient from the received bit stream, decoding the extracted information and determining a sub-block including the last non-zero coefficient.

According to various exemplary embodiments, video compression performance may be enhanced by reducing the size of information of a pixel position of a non-zero conversion coefficient.

BRIEF DESCRIPTION OF THE DRAWINGS

FIG. 5 is a view illustrating a conversion coefficient block divided into a plurality of sub-blocks according to an embodiment of the present invention;

DETAILED DESCRIPTION OF EXEMPLARY EMBODIMENTS

Figure 1:
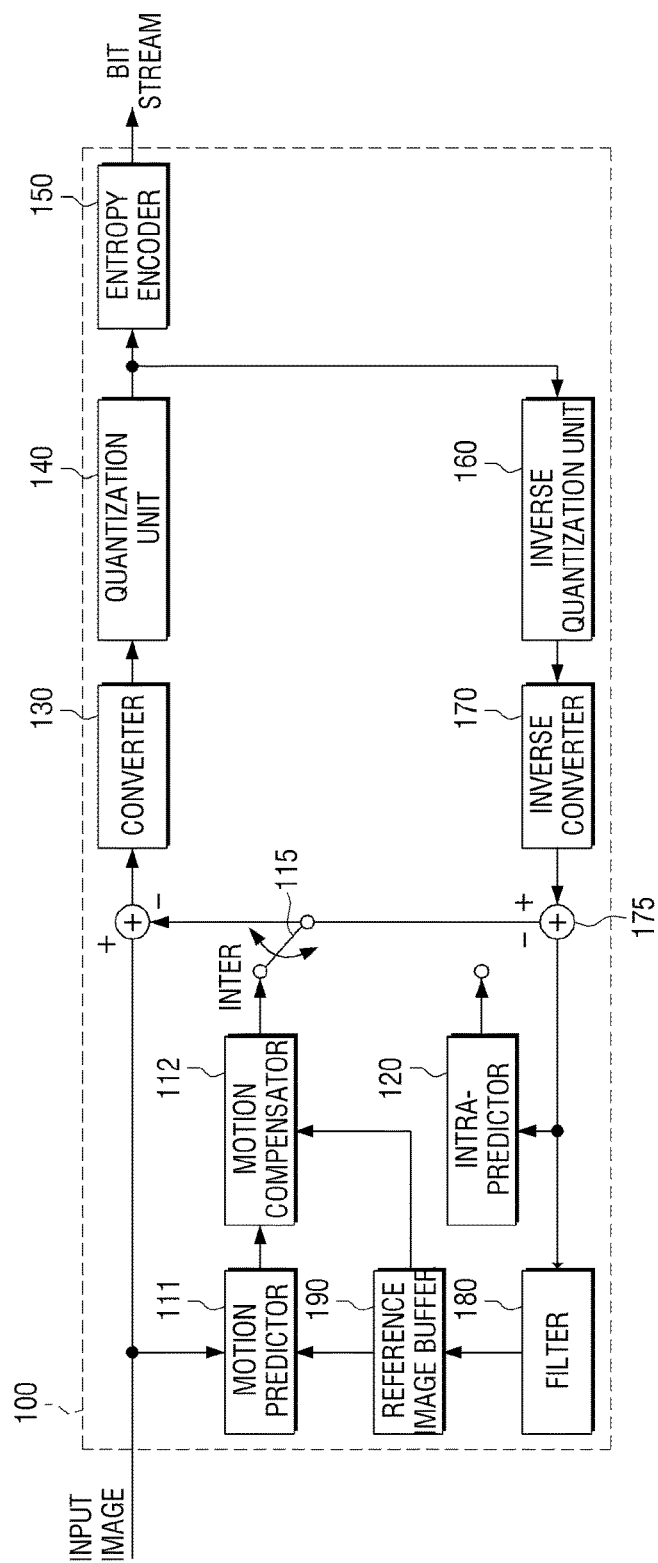
FIG. 1 is a block diagram provided to explain configuration of an encoding device according to an embodiment of the present invention.

Before describing the present invention in detail, a method of describing the present specification and drawings will be introduced.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

In addition, the same reference numerals as used in the accompanying drawings denote parts or components performing substantially the same function. For ease of explanation and understanding, different embodiments will be described using the same reference numerals. In other words, even though all the elements having the same reference numerals are shown in the plural drawings, the plural drawings do not mean one embodiment.

The terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

The terms used in the application are merely used to describe particular exemplary embodiments, and are not intended to limit the invention. Singular forms in the invention are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module and may be realized as at least one processor except for 'modules', 'units' or 'parts' that should be realized in a specific hardware.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Hereinafter, various embodiments of the present invention will be described in detail with reference to the accompanying drawings.

FIG. 1 is a block diagram provided to explain configuration of an encoding device according to an embodiment. Referring to FIG. 1, an encoding device 100 may include a motion predictor 111, a motion compensator 112, an intra-predictor 120, a switch 115, a subtractor 125, a converter 130, a quantization unit 140, an entropy encoder 150, an inverse quantization unit 160, an inverse converter 170, an adder 175, a filter 180 and a reference image buffer 190.

The encoding device 100 may encode an input image in an intra-mode or an inter-mode and output a bit stream. Intra-prediction may refer to predicting within a screen and Inter-prediction may refer to predicting between screens. In the intra-mode, the switch 115 may be converted into the intra-mode, and in the inter-mode, the switch 115 may be converted into the inter-mode. The encoding device 100 may generate a prediction block with regard to an input block of the input image and encode a difference between the input block and the prediction block.

In the intra-mode, the intra-predictor 120 may perform spatial prediction by using a pixel value of the nearby encoded block and generate a prediction block.

In the inter-mode, the motion predictor 111 may search for an area most suitable for the input block from a reference image stored in the reference image buffer 190 in a motion prediction process to obtain a motion vector. The motion compensator 112 may perform motion compensation using the motion vector and the reference image stored in the reference image buffer 190, thereby generating a prediction block.

The subtractor 125 may create a residual block generated by a difference between the input block and the generated prediction block. The converter 130 may convert the residual block and output a conversion coefficient. In addition, the quantization unit 140 may quantize the input conversion coefficient according to a quantization parameter and output a quantized coefficient.

The entropy encoder 150 may output a bit stream by entropy encoding a symbol according to a probability distribution based on values calculated by the quantization unit 140 or encoding parameter values calculated in an encoding process. Hereinafter, the entropy encoder 150 may be referred to as the encoder 150 for convenience of explanation. A method of entropy encoding may refer to receiving symbols having various values, removing static redundancy and expressing the symbols having values in a decodable binary column.

The symbol may refer to a syntax element to be encoded/decoded, a coding parameter, the value of a residual signal, and the like. The encoding parameter may be a parameter necessary for encoding and decoding and may include not only the information encoded in the encoding device 100 and transmitted to the decoding device 200 such as the syntax elements but also the information that can be inferred in the encoding or decoding process and refer to information necessary for encoding or decoding an image.

The encoding parameter may include, for example, values or static results such as intra/inter prediction mode, movement/motion vector, reference image index, encoding block pattern, residual signal presence, conversion coefficient, quantized conversion coefficient, quantization parameter, block size, block dividing information, etc. In addition, the residual signal may refer to a difference between an original signal and a prediction signal, a signal in which the difference between the original signal and the prediction signal is converted, or a signal in which the difference between the original signal and the prediction signal is converted and quantized. The residual signal may be referred to as a residual block in a block unit.

When the entropy encoding is applied, the small number of bits may be allocated to a symbol having a high probability of occurrence, and the large number of bits may be allocated to a symbol having a low probability of occurrence, thereby reducing the size of a bit column regarding encoding target symbols. Therefore, the compression performance of image encoding may be enhanced through the entropy encoding.

For the entropy encoding, an encoding method such as exponential golomb, Context-Adaptive Variable Length Coding (CAVLC), and Context-Adaptive Binary Arithmetic Coding (CABAC) may be used. For example, a table for performing the entropy encoding such as a Variable Length Coding/Code (VLC) table may be stored in the encoder 150, and the encoder 150 may perform the entropy encoding using the stored VLC table. In addition, the encoder 150 may obtain a binarization method of a target symbol and a probability model of a target symbol/bin, and then perform the entropy encoding using the obtained binarization method or probability model.

The quantized coefficient may be inversely quantized in the inverse quantization unit 160 and inversely converted in the inverse converter 170. The inversely quantized and inversely converted coefficient may be added to the prediction block through the adder 175 and a restoration block may be generated.

The restoration block may pass through the filter 180 and the filter 180 may apply at least one of deblocking filter, Sample Adaptive Offset (SAO), and Adaptive Loop Filter (ALF) to a restoration block or a restoration picture. The restoration block that passed through the filter 180 may be stored in the reference image buffer 190.

Constituents directly related to encoding of images, among the constituents included in the encoding device 100, such as the motion predictor 111, the motion compensator 112, and the intra-predictor 120, the switch 115, the subtractor 125, the converter 130, the quantization unit 140, the encoder 150, the inverse quantization unit 160, the inverse converter 170, the filter 180, etc. may be commonly referred to as an encoder separately from other components.

Figure 2:
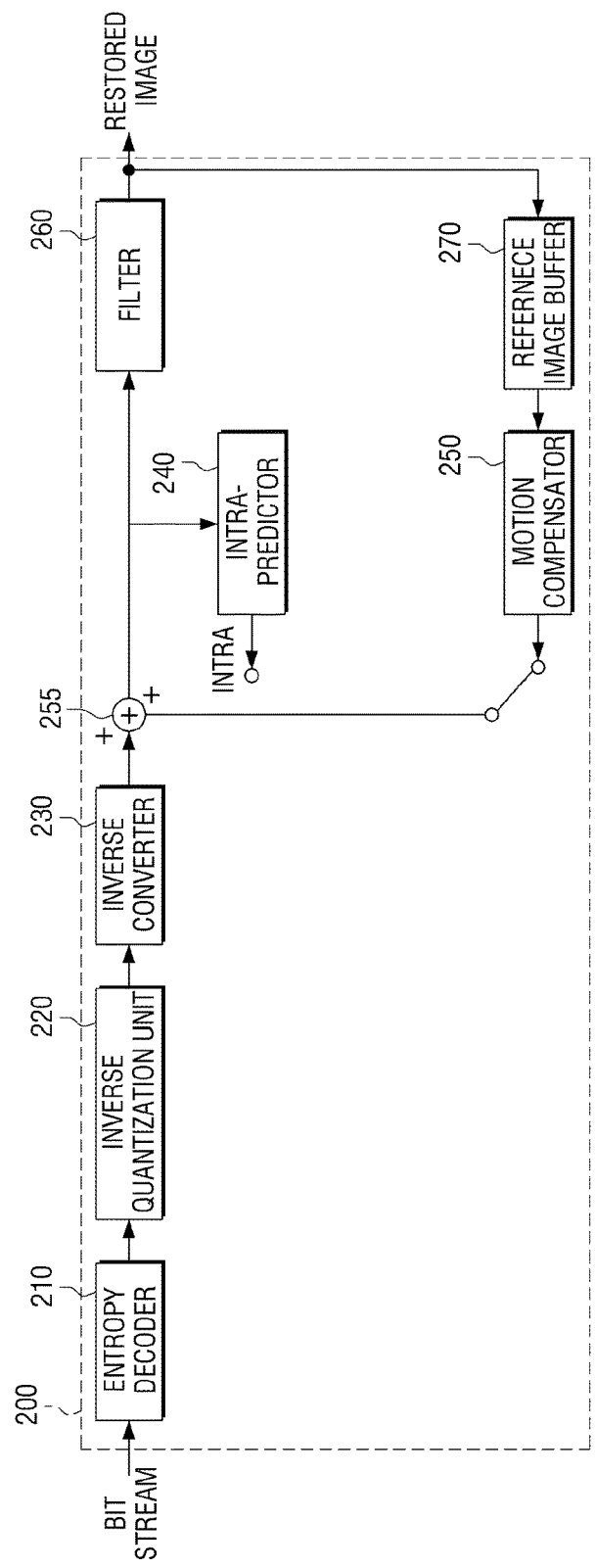
FIG. 2 is a block diagram provided to explain configuration of a decoding device according to an embodiment of the present invention.

FIG. 2 is a block diagram provided to explain configuration of a decoding device according to an embodiment. Referring to FIG. 2, a decoding device 200 may include an entropy decoder 210, an inverse quantization unit 220, an inverse converter 230, an intra-predictor 240, a motion compensator 250, a filter 260 and a reference image buffer 270.

The decoding device 200 may receive a bit stream output from the encoding device, perform decoding in an intra-mode or an inter-mode, and output a reconstituted image, i.e. a restoration image. In the intra-mode, the switch may be converted into the intra-mode, and in the inter-mode, the switch may be converted into the inter-mode. The decoding device 200 may obtain the residual block restored from the input bit stream, generate a prediction block and create a block reconstituted by adding the stored residual block to the prediction block, i.e. a restoration block.

The entropy decoder 210 may entropy-decode the input bit stream according to a probability distribution and generate symbols including a symbol in a quantized coefficient form. Hereinafter, the entropy decoder 210 may be referred to as the decoder 210 for the sake of convenience. An entropy decoding method may refer to generating each symbol by receiving a binary column. The entropy decoding method may be similar to the entropy encoding method described above.

The quantized coefficient may be inversely quantized in the inverse quantization unit 220 and inversely converted in the inverse converter 230. After the quantized coefficient is inversely quantized/inversely converted, the restored residual block may be generated.

In the intra-mode, the intra-predictor 240 may perform spatial prediction by using a pixel value of the nearby encoded block and generate a prediction block. In the inter-mode, the motion compensator 250 may perform motion compensation by using a motion vector and a reference image stored in the reference image buffer 270, thereby generating a prediction block.

The restored residual block may be added to the prediction block by the adder 255 and the added block may pass through the filter 260. The filter 260 may apply at least one of the deblocking filter, the SAO and the ALF to a restoration block or a restoration picture. The filter 260 may output a reconstituted image, i.e. a restoration image. The restoration image may be stored in the reference image buffer 270 and used for prediction between screens.

Constituents directly related to decoding of images such as the decoder 210, the inverse quantization unit 220, the inverse converter 230, the intra-predictor 240, the motion compensator 250, the filter 260 and the reference image buffer 260 included in the decoding device 200, for example, the decoder 210, the inverse quantization unit 220, the inverse converter 230, the intra-predictor 240, the motion compensator 250, the filter 260, etc. may be commonly referred to as a decoder separately from the other constituents.

The decoding device 200 may further include a parser (not shown) for parsing information related to the encoded image included in a bit stream. The parser may include the decoder 210, or be included in the decoder 210. Such the parser may be embodied as a constituent of the decoder 210.

Figure 3:
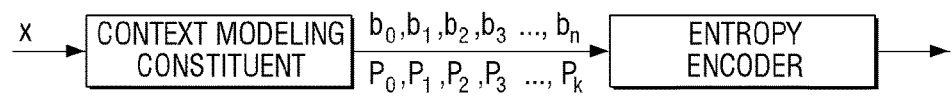
FIG. 3 is a block diagram illustrating an encoding process according to an embodiment of the present invention.

FIG. 3 is a block diagram illustrating an encoding process according to an embodiment.

The encoding process may include a context modeling constituent and an entropy encoder. The context modeling constituent may receive an input sequence x (bit sequence b0, b1, . . . and bn). The context modeling constituent may determine a context for each bit $b_i$ based on one or more previous bits in the sequence and determine a probability $p_i$ associated with the bit $b_i$ based on the context. This probability may refer that a bit is a Least Probable Symbol (LPS). According to the protocol, the LPS may be "0" or "1" in an embodiment of the binary column. Determining a probability may itself depend on the previous bits/symbols for the same context.

The context modeling constituent may output the input sequence, i.e. the bits (b0, b1, . . . and bn) with their respective probabilities (p0, p1, . . . and pn). The probabilities may be the estimated probabilities determined by a context model. This data including the bits and their respective probabilities may be input to the entropy encoder that encodes the input sequence using probability information. The entropy encoder may be a binary arithmetic coder. The entropy encoder may output a bit stream of the encoded data.

Figure 4:
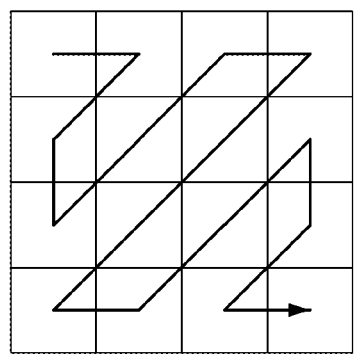
FIG. 4 is a view illustrating a coding order of 4×4 conversion coefficient block according to an embodiment of the present invention.

FIG. 4 is a view illustrating a coding order of 4×4 conversion coefficient block according to an embodiment.

Referring to a 4×4 DCT block according to the HEVC standard of FIG. 4, a scan order may start from the upper left corner of a block to the lower right corner of the block, along a scan pattern in a diagonal direction, a horizontal direction, or a vertical direction. The context model used in the HEVC standard may encode a coefficient of each block in a reverse order from the last non-zero coefficient according to the scan pattern. Scanning may be terminated after encoding the last non-zero coefficient, and the lengths of the sequences to be encoded may vary depending on coefficient values.

FIG. 5 is a view illustrating a conversion coefficient block divided into a plurality of sub-blocks according to an embodiment.

As shown in FIG. 5, the encoder 150 of the encoding device 100 may divide a conversion coefficient block constituting an image frame into a plurality of sub-blocks. The encoder 150 may divide the conversion coefficient block into the plurality of sub-blocks in various ways according to the characteristic of image. For example, the size of each sub-block may be different. FIG. 5 illustrates that the conversion coefficient block of the size of 16×16 pixels is divided into nine sub-blocks.

Specifically, the encoder 150 may determine a position of a pixel including a last non-zero coefficient in a conversion coefficient block constituting an image frame with reference to a predetermined pixel of the conversion coefficient block. The position of the last non-zero coefficient may be represented by a pixel coordinate indicating that the last non-zero coefficient is disposed at an xth pixel and a yth pixel with reference to the predetermined pixel of the conversion coefficient block. For example, the encoder 150 may present position information of a pixel disposed at the left upper corner by a pixel coordinate (0, 0), and the pixel including the last non-zero coefficient may be represented by a pixel coordinate (x, y). However, as the size of the conversion coefficient block increases, particularly, in the case where the conversion coefficient block has the size of 64×64 pixels or more, the amount of data for indicating the pixel including the last non-zero coefficient increases, thereby significantly reducing efficiency of encoding. The table blow illustrates a unary code and a binary code required for indicating a pixel coordinate (x, y) of the pixel including the last non-zero coefficient.

TABLE 1

| Magnitude of last position component x, y | Truncated unary (context model) | Fixed binary(by pass) |
|---|---|---|
| 0 | 0 | — |
| 1 | 10 | — |
| 2 | 110 | — |
| 3 | 111(0) | — |
| 4-5 | 11110 | |
| 6-7 | 11111(0) | X |
| 8-11 | 1111110 | XX |
| 12-15 | 1111111(0) | XX |
| 16-23 | 111111110 | |
| 24-31 | 111111111 | XX |

To solve such the problem, the encoder 150 may determine a sub-block including the pixel including the last non-zero coefficient in the conversion coefficient block divided into the plurality of sub-blocks as describe above. Referring to FIG. 5, in the case where the last non-zero coefficient is included in the sixth sub-block, the encoder 150 may encode data of the sub-block including the last non-zero coefficient such as 'code zoneIndex==6'.

Figure 6:
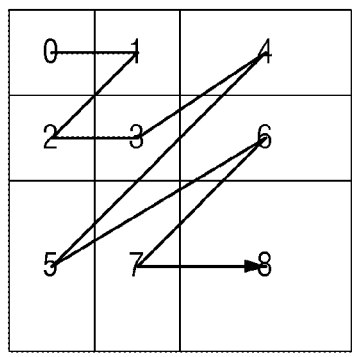
FIG. 6 is a view illustrating a scanning order of a conversion coefficient block divided into a plurality of sub-blocks according to an embodiment of the present invention.

The data for a sub-block including the last non-zero coefficient may be represented by binary data, for example, the zeroth sub-block may be represented by 1, 01, the first sub-block may be represented by 01, the second sub-block may be represented by 001, the third sub-block may be represented by 0001, the fourth sub-block may be represented by 00001, the fifth sub-block may be represented by 000001, the sixth sub-block may be represented by 0000001, the seventh sub-block may be represented by 00000001 and the eight sub-block may be represented by 00000000. In other words, according to an encoding order shown in FIG. 6, the encoder 150 may encode a sub-block which does not include the last non-zero coefficient by 0 and a sub-block including the last non-zero coefficient by 1. However, a method of binarizing index of a sub-block may include may include various methods such as a truncated unary method as shown in Table 1. For example, the 0th sub-block may be represented by 0, and the remaining 1st through 8th sub-blocks may be represented by a data format of 0xxx such as 0000, 0001, 0010, 0011, 0100, 0101, 0110 and 0111.

The encoder 150 may convert a position of the last non-zero coefficient determined with reference to a predetermined pixel of the conversion coefficient block into a position with reference to a predetermined pixel of the sub-block including the last non-zero coefficient and encode the position. In other words, the converted position of the last non-zero coefficient may be represented by a pixel coordinate (x', y') indicating that the last non-zero coefficient is disposed at an x'th pixel and an y'th pixel with reference to the predetermined pixel of the sub-block. Specifically, when the position of a pixel disposed at the left upper corner of the sub-block is represented by a pixel coordinate (a, b) with reference to a pixel coordinate (0, 0) of the pixel disposed at the left upper corner of the conversion coefficient block, the pixel coordinate (x', y') may be defined by a pixel coordinate (x−a, y−b).

Figure 7:
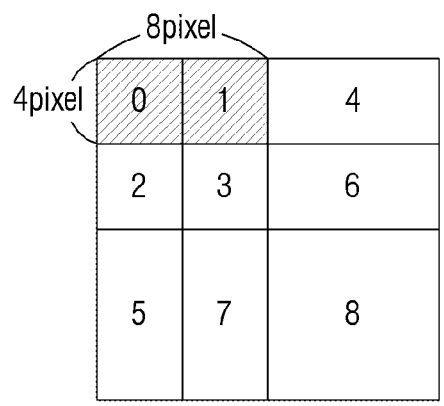
FIG. 7 is a view provided to explain a converting method of information of a position of a last non-zero coefficient according to an embodiment of the present invention.

For example, as shown in FIG. 7, when the last non-zero coefficient is included in the sixth sub-block, a pixel coordinate of the pixel disposed at the left upper corner of the sixth the sub-block may be defined by a pixel coordinate (8, 4). The encoder 150 may present the position of the last non-zero coefficient with reference to the pixel coordinate (0, 0) of the pixel disposed at the left upper corner of the conversion coefficient block by a new coordinate (x', y')= (x−8, y−4) with reference to the pixel coordinate (8, 4) of the pixel disposed at the left upper corner of the sixth sub-block.

The encoder 150 may encode a sub-block 'code zoneIndex' including the last non-zero coefficient and a position code (last x', last y') of the last non-zero coefficient with reference a predetermined pixel of the sub-block including the last non-zero coefficient, thereby saving the number of bits required for encoding the position of the last non-zero coefficient. In FIG. 7, when the pixel coordinate (x, y) is represented by the new coordinate (x', y')=(x−8, y−4), the number of bits for indicating whether the coefficient of 8×4 pixel of the zeroth sub-block and the first sub-block is a non-zero coefficient. In other words, since x of '000000001' may be represented by '1' and y of '00001' may be represented by '1', thereby saving 8 bits for an x coordinate and 4 bits for a y coordinate.

Figure 8:
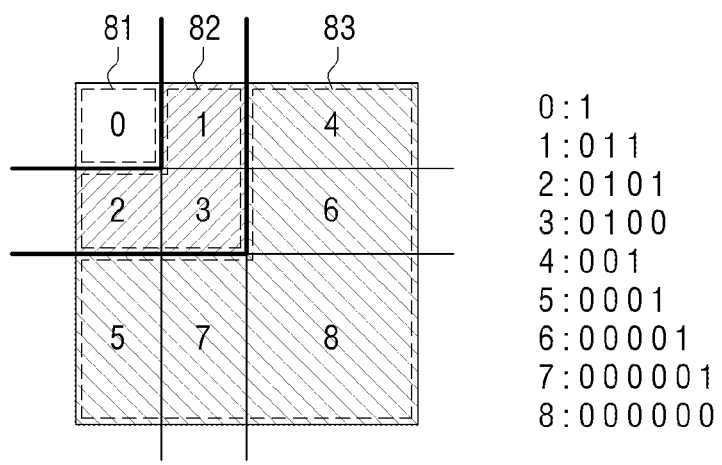
FIG. 8 is a view provided to explain a converting method of information of a position of a last non-zero coefficient according to another embodiment of the present invention.

FIG. 8 is a view provided to explain a method of converting information of a position of a last non-zero coefficient according to another embodiment.

The encoder 150 may divide a conversion coefficient block into a plurality of groups each including at least one sub-block and encode information of a group including a last non-zero coefficient and information of a sub-block including the last non-zero coefficient of at least one sub-block constituting the group.

The plurality of sub-blocks may be grouped in various ways, but as shown in FIG. 8, nine sub-blocks into which the conversion coefficient block divided may be grouped into first, second and third groups 81, 82 and 83. The first group 81 may be a sub-block disposed at the left upper corner of the conversion coefficient block, the second group 82 may be a group consisting of sub-blocks adjacent to the first group 81 and the third group 83 may be a group consisting of sub-blocks adjacent to the second group 82. In other words, as shown in FIG. 8, the second group 82 may consist of sub-blocks contacting the sides and corners of the first group 81, and the third group 83 may consist of sub-blocks contacting the sides and corners of the second group 82.

The encoder may encode information on the sizes of the plurality of groups to at least one parameter set among slice header, Picture Parameter Sets (PPS) and Sequence Parameter Sets (SPS).

The encoder 150, in response to the last non-zero coefficient being present in a first group among the plurality of groups, may encode information indicating that the last non-zero coefficient is present in the first group and information of a sub-block including the last non-zero coefficient of at least one sub-block constituting the group.

Whether a sub-block including the last non-zero coefficient is included in each group may represented by binary data such as '1' and '0'. For example, referring to FIG. 8, in response to the last non-zero coefficient being present in a sub-block included in the first group 81, information of the group including the last non-zero coefficient may be represent by binary data such as '1'. In addition, since the first group 81 includes only one sub-block, the information of the sub-block including the last non-zero coefficient may be represented by binary data '1'.

If the last non-zero coefficient is disposed in a sub-block of the second group 82, not in a sub-block of the first group 81, the information of the group including the last non-zero coefficient may be represented by binary data such as '01'. The first bit '0' may indicate that the last non-zero coefficient is not disposed in the sub-block included in the first group 81, and the second bit '1' may indicate that the last non-zero coefficient is disposed in the sub-block included in the second group 82. If a sub-block including the last non-zero coefficient is a first sub-block of the second group, information of the sub-block including the last non-zero coefficient may be encoded by '011'. The third bit '1' may refer to that the first sub-block according to a scanning order among the sub-blocks included in the second group 82 may include the last non-zero coefficient In another embodiment, if a sub-block including the last non-zero coefficient is disposed in the second sub-block of the second group 82, information of the sub-block including the last non-zero coefficient may be encoded by '0101'. The third bit '0' may refer that the first sub-block among the sub-blocks included in the second group 82 may not include the last non-zero coefficient, and the fourth bit '1' may refer that the second sub-block according the scanning order among the sub-blocks included in the second group 82 may include the last non-zero coefficient.

In another embodiment, if a sub-block including the last non-zero coefficient is disposed in the third sub-block of the second group 82, the information of the sub-block including the last non-zero coefficient may be encoded by '01001'. The third bit '0' and the fourth bit '0' may refer that the first sub-block and the second sub-block among the sub-blocks included in the second group 82 may not include the last non-zero coefficient, and the fifth bit '1' may refer that the third sub-block according the scanning order among the sub-blocks included in the second group 82 may include the last non-zero coefficient. Since the third sub-block, the last sub-block according to the scanning order of the second group 82, includes the last non-zero coefficient, the encoded data '01001' may be represented by '0100' with the fifth bit '1' being omitted, and in the case, one bit more may be saved.

In the same manner, if the last non-zero coefficient is not disclosed in a sub-block included in the first group 81 or the second group 82, but disposed in a sub-block included in the third group 83, information of the group including the last non-zero coefficient may be represented by binary data such as '00'. The first bit '0' and the second bit '0' may refer that the last non-zero coefficient is not disposed in the sub-blocks included in the first group 81 and the second group 82.

If a sub-block including the last non-zero coefficient is disposed in a fourth sub-block of the third group 83, the information of the sub-block including the last non-zero coefficient may be encoded by '001'. The third bit '1' may refer that the fourth sub-block according to the scanning order in the third group 83 may include the last non-zero coefficient. If the sub-block including the last non-zero coefficient is disposed in a fifth sub-block of the third group 83, the information of the sub-block including the last non-zero coefficient may be encoded by '0001'. The third bit '0' may refer that the fourth sub-block of the third group 83 may not include the last non-zero coefficient and the fourth bit '1' may refer that the fifth sub-block of the third group 83 may include the last non-zero coefficient. If the sub-block including the last non-zero coefficient is the eighth sub-block of the third group 83, the information of the sub-block including the last non-zero coefficient may be encoded by '0000001'. The first bit '0' and the second bit '1' may refer that the last non-zero coefficient is not disposed in the sub-blocks included in the first group 81 and the second group 82. The third bit '0' to the sixth bit '0' may refer that the fourth block to the seventh block of the third group 83 may not include the last non-zero coefficient. The seventh bit '1' may refer that the eight sub-block according to the scanning order, among the plurality of sub-blocks included in the third group 83, may include the last non-zero coefficient. Since the eighth sub-block, the last sub-block of the third group 83 according to the scanning order, includes the last non-zero coefficient, the encoded data '0000001' may be represented by '000000' with the seventh bit '1' being omitted, and in this case, one bit more may be saved. However, binarization may be performed in a truncated unary method and various VLD methods. It is obvious that the way indicating whether each sub-block includes the last non-zero coefficient could be different from the embodiment shown in FIG. 8.

Figure 9:
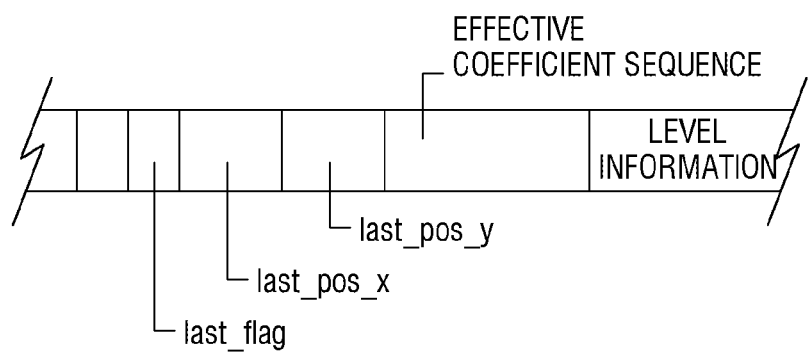
FIG. 9 is a schematic view illustrating a part of a bit stream according to an embodiment of the present invention.

FIG. 9 is a schematic view illustrating a part of a bit stream according to an embodiment.

A part of the bit stream shown in FIG. 9 may include data related to the conversion coefficient block. As shown in FIG. 9, the part of the bit stream may be a bit stream before entropy encoding or after entropy decoding. The entropy encoding may include CABAC, CAVLC, or other contexts based entropy coding methods.

The bit stream may include a flag last_flag indicating the last non-zero coefficient. If the last_flag is not set, the bit stream may include last_pos_x and last_pos_y, which are x and y coordinates of the last non-zero coefficient.

In other words, the encoder 150 may encode information of the sub-block including the last non-zero coefficient and the converted position of the last non-zero coefficient in a form of flag or index represented by binary data.

In addition, the encoder 150 may include a significant coefficient sequence and level information. The last_pos_x and last_pos_y values may be binarized using a fixed length binarization method. The length of the binary values may depend on the size of the conversion coefficient block.

Figure 10:
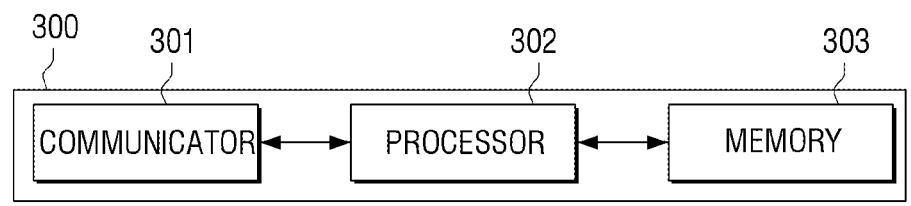
FIG. 10 is a schematic block diagram illustrating an encoding device according to another embodiment of the present invention.

FIG. 10 is a schematic block diagram illustrating an encoding device according to another embodiment.

An encoding device 300 according to another embodiment may include a communicator 301, a processor 302 and a memory 303.

The communicator 301 may be configured to perform communication with a decoding device 400 according to various types of communication. The communicator 301 may include a Wi-Fi chip, a Bluetooth chip, a wireless communication chip, and the like. The encoding device 300 may communicate with an external device including the decoding device 400 through the communicator 301. Specifically, the communicator 301 may transmit the encoded bit stream to the decoding device 200.

The memory 303 may store an encoding application. Specifically, the memory 303 may include a computer program or an application that includes commands constituting the processor 302 to perform the steps or operations as described herein. For example, an encoding application may encode a bit stream according to a last non-zero position encoding process described herein and output the encoded bit stream. The encoding application may use one or more processes described herein, entropy-encode an input sequence and output the bit stream. The encoding application may be stored on a computer readable medium such as a compact disc, a flash memory device, a random access memory, a hard drive, or the like.

Figure 11:
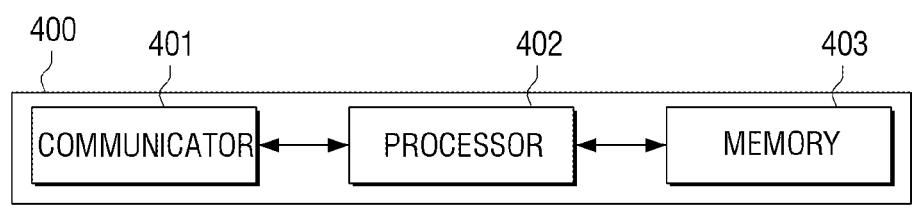
FIG. 11 is a schematic block diagram illustrating a decoding device according to another embodiment of the present invention.

FIG. 11 is a schematic block diagram illustrating a decoding device according to another embodiment.

The decoding device 400 according to another embodiment of the present invention may include a communicator 401, a processor 402 and a memory 403.

The communicator 410 may perform communication with an external device according to various types of communication methods in the same manner as the encoding device 300 and receive the encoded bit stream from the encoding device 300.

The memory 403 may include a computer program or an application including commands constituting the processor 402 to perform the steps or operations as described herein. For example, a decoding application may receive the bit stream encoded according to the last non-zero position encoding process described herein and reconstitute quantized conversion region coefficient data using a last non-zero position context modeling process for decoding the bit stream. The decoding application may be stored on a computer readable medium, such as a compact disk, a flash memory device, a random access memory, a hard drive, or the like.

Figure 12:
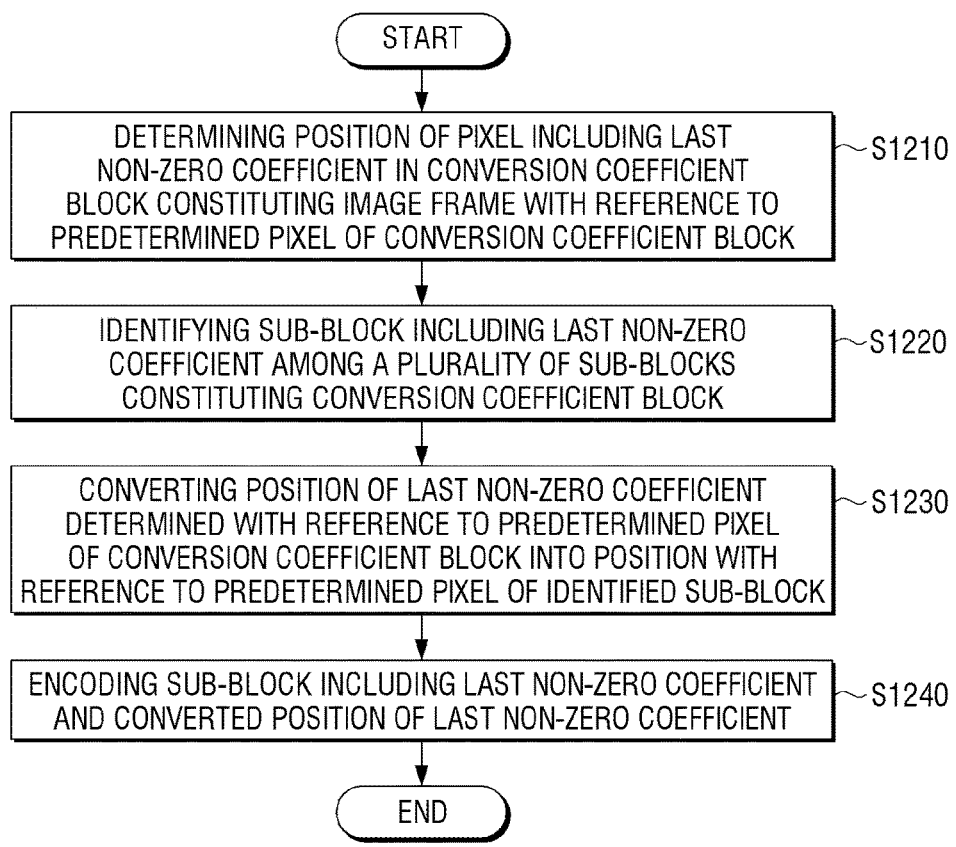
FIG. 12 is a flowchart provided to explain an encoding method according to an embodiment of the present invention.

FIG. 12 is a flowchart provided to explain an encoding method according to an embodiment.

A position of a pixel including a last non-zero coefficient in a conversion coefficient block constituting an image frame may be determined with reference to a predetermined pixel of the conversion coefficient block (S1210). The position of the last non-zero coefficient may be represented by a pixel coordinate (x, y) with reference to the predetermined pixel of the conversion coefficient block.

A sub-block including the last non-zero coefficient may be identified among a plurality of sub-blocks constituting the conversion coefficient block (S1220).

The position of last non-zero coefficient determined with reference to the predetermined pixel of the conversion coefficient block may be converted to a position with reference to a predetermined pixel of a sub-block (S1230). The converted position of the last non-zero coefficient may be represented by a pixel coordinate (x', y') with reference to the predetermined pixel of the sub-block. In addition, the predetermined pixel of the sub-block is represented by a pixel coordinate (a, b) with reference to the pixel coordinate of the predetermined pixel of the conversion coefficient block, the pixel coordinate (x', y') may be defined by a pixel coordinate (x−a, y−b).

The sub-block including the last non-zero coefficient and the converted position of the last non-zero coefficient may be encoded (S1240).

Figure 13:
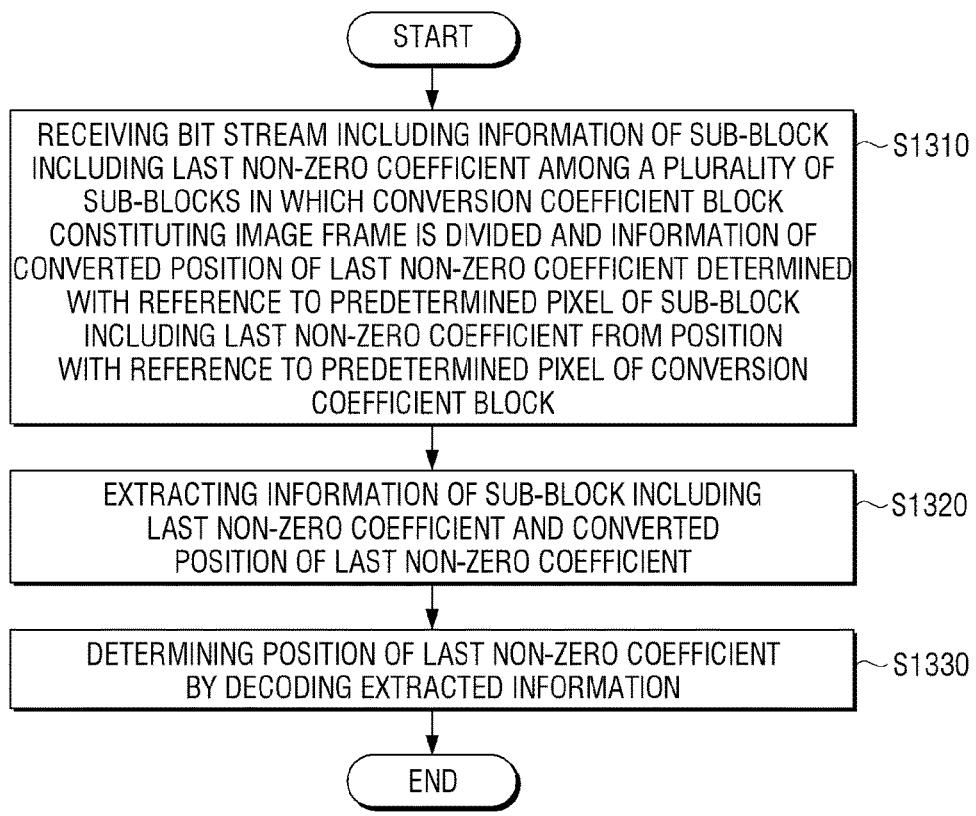
FIG. 13 is a flowchart provided to explain a decoding method according to an embodiment of the present invention.

FIG. 13 is a flowchart provided to explain a decoding method according to an embodiment of the present invention.

A bit stream including information of a sub-block including a last non-zero coefficient among a plurality of sub-blocks in which a conversion coefficient block constituting an image frame is divided and information of the converted position of the last non-zero coefficient determined with reference to a predetermined pixel of the sub-block including the last non-zero coefficient from a position with reference to a predetermined pixel of the conversion coefficient block is received (S1310). The position of the last non-zero coefficient may be represented by a pixel coordinate (x, y) indicating that the last non-zero coefficient is disposed at an xth pixel and a yth pixel with reference to the predetermined pixel of the conversion coefficient block, and the converted portion of the last non-zero coefficient may be represented by a pixel coordinate (x', y') indicating that the last non-zero coefficient is disposed at an x' pixel and a y' pixel with reference to the predetermined pixel of the sub-block.

In the case where the predetermined pixel of the sub-block is represented by a pixel coordinate (a, b) with reference to the pixel coordinate of the predetermined pixel of the conversion coefficient block, the pixel coordinate (x, y) may be represented by a pixel coordinate (x'+a, y'+b).

Information of the sub-block including the last non-zero coefficient and the converted position of the last non-zero coefficient may be extracted from the received bit stream (S1320).

A position of the last non-zero coefficient may be determined by decoding the extracted information (S1330).

The control methods according to various embodiments described above may be embodied as programs and stored in various record medium. In other words, a computer program that is processed by various processors and can execute the various control methods described above may be stored in the record medium for use.

For example, on a non-transitory computer readable medium may be provided storing a program for receiving information of a sub-block including a last non-zero coefficient among a plurality of sub-blocks in which a conversion coefficient block constituting an image frame is divided and information of the converted position of the last non-zero coefficient determined with reference to a predetermined pixel of the sub-block including the last non-zero coefficient from a position with reference to a predetermined pixel of the conversion coefficient block, extracting information of the sub-block including the last non-zero coefficient and the converted position of the last non-zero coefficient according to a predetermined scanning order from the received bit stream, and determining a position of the last non-zero coefficient by decoding the extracted information.

According to an embodiment of the present invention, a process may be stored in a non-transitory readable medium in the form of a program, which is not a medium for storing data for a short period of time such as register, cache, memory, etc., but a medium for semi-permanently data. This means that the non-transitory readable medium is a medium read by a device. In particular, the various applications or programs described above may be stored on the non-transitory computer readable medium such as a compact disk (CD), a digital versatile disk (DVD), a hard disk, a Blu-ray disk, a universal serial bus (USB), a memory card, a read only memory (ROM), or the like.

Although exemplary embodiments have been shown and described, it will be appreciated by those skilled in the art that changes may be made to these exemplary embodiments without departing from the principles and spirit of the present disclosure. Accordingly, the scope of the present invention is not construed as being limited to the described exemplary embodiments, but is defined by the appended claims as well as equivalents thereto.

What is claimed is:

1. An encoding device for encoding a bit stream including an image frame, comprising:

a processor configured to divide a conversion coefficient block into a plurality of groups, each of the plurality of groups including at least one sub-block, identify a position of a pixel having a last non-zero coefficient in the conversion coefficient block constituting the image frame with reference to a predetermined pixel of the conversion coefficient block, identify a sub-block including the last non-zero coefficient, among a plurality of sub-blocks constituting the plurality of groups, convert a position of the last non-zero coefficient identified with reference to the predetermined pixel of the conversion coefficient block into a position with reference to a predetermined pixel of the identified sub-block, and obtain bit stream by encoding the sub-block including the last non-zero coefficient and the converted position of the last non-zero coefficient; and a communicator configured to transmit the obtained bit stream to a decoding device, wherein the processor is further configured to:

in response to the last non-zero coefficient being present in a first group among the plurality of groups, encode information which indicates that the last non-zero coefficient is present in the first group and information of a sub-block including the last non-zero coefficient of at least one sub-block constituting the first group, and in response to the last non-zero coefficient being present in a second group except the first group among the plurality of groups, encode information which indicates that the last non-zero coefficient is not present in the first group, among the plurality of groups, information which indicates that the last non-zero coefficient is present in the second group, and information of a sub-block including the last non-zero coefficient of at least one sub-block constituting the second group.

2. The encoding device as claimed in claim 1, wherein the position of the last non-zero coefficient is represented by a pixel coordinate (x, y) which indicates that the last non-zero coefficient is disposed at an xth pixel and a yth pixel with reference to the predetermined pixel of the conversion coefficient block, and the converted position of the last non-zero coefficient is represented by a pixel coordinate (x', y') which indicates that the last non-zero coefficient is disposed at an x'th pixel and a y'th pixel with reference to the predetermined pixel of the sub-block.

3. The encoding device as claimed in claim 2, wherein in the case where the predetermined pixel of the sub-block is represented by a pixel coordinate (a, b) with reference to a pixel coordinate of the predetermined pixel of the conversion coefficient block, the pixel coordinate (x', y') is defined by a pixel coordinate (x−a, y−b).

4. The encoding device as claimed in claim 1, wherein the processor is configured to encodes information on sizes of the plurality of groups to at least one parameter set, among slice header, Picture Parameter Sets (PPS) and Sequence Parameter Sets (SPS).

5. The encoding device as claimed in claim 1, wherein the processor is configured to, in response to the last non-zero coefficient being present in a third group except the first and second groups among the plurality of groups, encodes information which indicates that the last non-zero coefficient is not present in the first and second groups, among the plurality of groups, information which indicates that the last non-zero coefficient is present in the third group, and information of a sub-bock including the last non-zero coefficient of at least one sub-block constituting the third group.

6. The encoding device as claimed in claim 1, wherein the processor is configured to encodes information of the sub-block including the last non-zero coefficient and the converted position of the last non-zero coefficient in a form of index or flag.

7. A method of encoding a bit stream including an image frame, the method comprising:
dividing a conversion coefficient block into a plurality of groups, each of the plurality of groups including at least one sub-block;
identifying a position of a pixel having a last non-zero coefficient in the conversion coefficient block constituting the image frame with reference to a predetermined pixel of the conversion coefficient block;
identifying a sub-block including the last non-zero coefficient, among a plurality of sub-blocks constituting the plurality of groups;
converting a position of the last non-zero coefficient identified with reference to a predetermined pixel of the conversion coefficient block into a position with reference to a predetermined pixel of the identified sub-block; and
encoding the sub-block including the last non-zero coefficient and the converted position of the last non-zero coefficient,
wherein the encoding further comprises:
in response to the last non-zero coefficient being present in a first group among the plurality of groups, encoding information which indicates that the last non-zero coefficient is present in the first group and information of a sub-block including the last non-zero coefficient of at least one sub-block constituting the first group, and
in response to the last non-zero coefficient being present in a second group except the first group among the plurality of groups, encoding information which indicates that the last non-zero coefficient is not present in the first group, among the plurality of groups, information which indicates that the last non-zero coefficient is present in the second group, and information of a sub-block including the last non-zero coefficient of at least one sub-block constituting the second group.

8. The method as claimed in claim 7, wherein the position of the last non-zero coefficient is represented by a pixel coordinate (x, y) which indicates that the last non-zero coefficient is disposed at an xth pixel and a yth pixel with reference to the predetermined pixel of the conversion coefficient block, and the converted position of the last non-zero coefficient is represented by a pixel coordinate (x', y') which indicates that the last non-zero coefficient is disposed at an x'th pixel and a y'th pixel with reference to the predetermined pixel of the sub-block.

* * * * *